United States Patent
El Hamss et al.

(10) Patent No.: US 12,348,319 B2
(45) Date of Patent: Jul. 1, 2025

(54) METHODS FOR CONTENTION WINDOW SIZE ADJUSTMENT IN UNLICENSED SPECTRUM

(71) Applicant: InterDigital Patent Holdings, Inc., Wilmington, DE (US)

(72) Inventors: Aata El Hamss, Laval (CA); J. Patrick Tooher, Montreal (CA); Shahrokh Nayeb Nazar, San Diego, CA (US); Afshin Haghighat, Ile-Bizard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 483 days.

(21) Appl. No.: 17/430,930

(22) PCT Filed: Feb. 13, 2020

(86) PCT No.: PCT/US2020/018054
§ 371 (c)(1),
(2) Date: Aug. 13, 2021

(87) PCT Pub. No.: WO2020/168039
PCT Pub. Date: Aug. 20, 2020

(65) Prior Publication Data
US 2022/0131648 A1 Apr. 28, 2022

Related U.S. Application Data

(60) Provisional application No. 62/908,220, filed on Sep. 30, 2019, provisional application No. 62/805,126, filed on Feb. 13, 2019.

(51) Int. Cl.
*H04L 1/1867* (2023.01)
*H04L 1/1812* (2023.01)
(Continued)

(52) U.S. Cl.
CPC ............ *H04L 1/187* (2013.01); *H04L 1/1812* (2013.01); *H04L 1/1825* (2013.01);
(Continued)

(58) Field of Classification Search
None
See application file for complete search history.

(56) References Cited

U.S. PATENT DOCUMENTS

| 2015/0049709 A1 | 2/2015 | Damnjanovic et al. |
| 2018/0124828 A1 | 5/2018 | Kim et al. |

(Continued)

FOREIGN PATENT DOCUMENTS

| CN | 107580801 A | 1/2018 |
| CN | 107624265 A | 1/2018 |

(Continued)

OTHER PUBLICATIONS

IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Jay L Vogel
(74) *Attorney, Agent, or Firm* — Flaster Greenberg, P.C.

(57) ABSTRACT

Method and apparatuses for communication over an unlicensed band are provided herein. A method may comprise transmitting transport blocks in each slot of a plurality of slots and determining a Hybrid Automatic Repeat Request (HARQ) status for each of the transmitted transport blocks. The method may further comprise determining a weighting coefficient for each of the determined HARQ statuses and calculating, based on the determined HARQ statuses and weighting coefficients, a weighted average of the HARQ (Continued)

statuses for the transmitted transport blocks. The method may further comprise adjusting a Listen-Before-Talk (LBT) contention window size based on the calculated weighted average of the HARQ statuses.

17 Claims, 8 Drawing Sheets

(51) Int. Cl.
  *H04L 1/1825* (2023.01)
  *H04L 1/1829* (2023.01)
  *H04W 16/14* (2009.01)
  *H04W 74/0808* (2024.01)
  *H04W 74/0816* (2024.01)

(52) U.S. Cl.
  CPC .......... *H04L 1/1854* (2013.01); *H04L 1/1896* (2013.01); *H04W 16/14* (2013.01); *H04W 74/0808* (2013.01); *H04W 74/0816* (2013.01)

(56) References Cited

U.S. PATENT DOCUMENTS

| | | | |
|---|---|---|---|
| 2018/0139779 A1 | 5/2018 | Kim et al. | |
| 2018/0242360 A1 | 8/2018 | Noh et al. | |
| 2018/0254858 A1 | 9/2018 | He et al. | |
| 2018/0288790 A1 | 10/2018 | Kim et al. | |
| 2019/0335496 A1* | 10/2019 | Li | H04L 1/1887 |
| 2020/0045734 A1 | 2/2020 | Park et al. | |
| 2020/0084005 A1* | 3/2020 | Yoshimura | H04L 1/1671 |
| 2020/0128583 A1* | 4/2020 | Yerramalli | H04L 5/0055 |
| 2020/0274749 A1 | 8/2020 | Liu et al. | |
| 2020/0221310 A1 | 9/2020 | Babaei et al. | |
| 2021/0219339 A1* | 7/2021 | Tang | H04W 74/08 |
| 2021/0360673 A1* | 11/2021 | Myung | H04L 1/1864 |

FOREIGN PATENT DOCUMENTS

| | | | | |
|---|---|---|---|---|
| CN | 108141311 A | 6/2018 | | |
| CN | 108293268 A | 7/2018 | | |
| EP | 3305005 A1 | 4/2018 | | |
| RU | 2671007 C1 * | 10/2018 | ........... | H04L 1/1867 |
| WO | 2016191102 A1 | 1/2016 | | |
| WO | WO 2018/012919 A1 | 1/2018 | | |
| WO | WO-2019216705 A1 * | 11/2019 | ........... | H04L 1/1614 |
| WO | 2020/067687 | 4/2020 | | |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Channel access in NR-U," 3GPP TSG RAN WG1 #96bis, R1-1904853, Xi'an, China (Apr. 8-12, 2019).
Interdigital Inc., "Contention window adjustment and coexistence in NR-U," 3GPP TSG RAN WG1 #96, R1-1902587, Athens, Greece (Feb. 25-Mar. 1, 2019).
Interdigital, Inc., "Channel access in NR-U," 3GPP TSG RAN WG1 #97, R1-1906762, Reno, USA (May 13-17, 2019).
Interdigital, Inc., "Channel access in NR-U," 3GPP TSG RAN WG1 #98, R1-19 09010, Prague, CZ (Aug. 26-30, 2019).
Qualcomm Inc., "New WID on NR-based Access to Unlicensed Spectrum," 3GPP TSG RAN Meeting #82, RP-182878, Sorrento, Italy (Dec. 10-13, 2018).
Third Generation Partnership Project, "Technical Specification Group Radio Access Network; NR; Physical layer procedures for control (Release 15)," 3GPP TS 38.213 V15.3.0 (Sep. 2018).
Third Generation Partnership Project, "Technical Specification Group Radio Access Network; NR; Physical layer procedures for control (Release 15)," 3GPP TS 38.213 V15.4.0 (Dec. 2018).
Third Generation Partnership Project, "Technical Specification Group Radio Access Network; NR; Physical layer procedures for control (Release 15)," 3GPP TS 38.213 V15.8.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Medium Access Control (MAC) protocol specification (Release 15)," 3GPP TS 38.321 V15.1.0 (Mar. 2018).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.4.0 (Dec. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.8.0 (Dec. 2019).
Third Generation Partnership Project, "Technical Specification Group Radio Access Network; Evolved Universal Terrestrial Radio Access (E-UTRA); Physical layer procedures (Release 16)," 3GPP TS 36.213 V16.0.0 (Dec. 2019).
Third Generation Partnership Project, "Technical Specification Group Radio Access Network; Physical layer procedures for shared spectrum channel access (Release 15)," 3GPP TS 37.213 V15.2.0 (Mar. 2019).
Third Generation Partnership Project, "Technical Specification Group Radio Access Network; Physical layer procedures for shared spectrum channel access (Release 15)," 3GPP TS 37.213 V15.1.0 (Sep. 2018).
Third Generation Partnership Project, "Technical Specification Group Radio Access Network; Physical layer procedures for shared spectrum channel access (Release 16)," 3GPP TS 37.213 V16.0.0 (Dec. 2019).

(56) References Cited

OTHER PUBLICATIONS

ZTE, "Discussion on channel access mechanism for NR-U," 3GPP TSG RAN WG1 Meeting #95, R1-1812435, Spokane, USA (Nov. 12-16, 2018).
Third Generation Partnership Project (3GPP), "HARQ Enhancements in NR Unlicensed", Huawei, HiSilicon, 3GPP TSG RAN WG1 Ad-Hoc Meeting 1901, Taipei, Jan. 21-25, 2019, R1-1900062, 11 pages.

* cited by examiner

METHODS FOR CONTENTION WINDOW SIZE ADJUSTMENT IN UNLICENSED SPECTRUM

CROSS-REFERENCE TO RELATED APPLICATIONS

This application is the U.S. National Stage, under 35 U.S.C. § 371, of International Application No. PCT/US2020/018054, filed Feb. 13, 2020, which claims the benefit of U.S. Provisional Application No. 62/805,126, filed Feb. 13, 2019, and U.S. Provisional Application No. 62/908,220, filed Sep. 30, 2019, the contents of which are incorporated herein by reference.

BACKGROUND

Channel access in an unlicensed frequency band typically uses a Listen-Before-Talk (LBT) mechanism or procedure. In an LBT procedure, a network node or WTRU may first detect transmissions being performed over a given channel before commencing a transmission of its own. In some cases, LBT procedures are mandated independently of whether the channel is occupied or not. In other cases, a transmission may be performed immediately after a short switching gap.

For frame-based systems, an LBT mechanism or procedure may be characterized by a Clear Channel Assessment (CCA) time period (e.g., ~20 µs), a channel occupancy time period (e.g., minimum 1 ms, maximum 10 ms), an idle period (e.g., minimum 5% of the channel occupancy time), a fixed frame period (e.g., equal to the channel occupancy time plus the idle period), a short control signaling transmission time (e.g., maximum duty cycle of 5% within an observation period of 50 ms), and a CCA energy detection threshold.

For load-based systems, such as those in which a transmit/receive vehicle may not be fixed in time, LBT procedures may be characterized by a number N corresponding to the number of clear idle slots in an extended CCA period instead of the fixed frame period. N may be selected randomly within a range. In 3rd Generation Partnership Project (3GPP) Long-Term Evolution (LTE) standards pertaining to operations in an unlicensed spectrum, there are two categories of CCA periods for both uplink and downlink transmissions. In the first category, a node may sense the channel for N slot durations, where N may be a random value selected from a range of allowed values, called the Contention Window (CW). The LBT Contention Window Size (CWS) and adjustments may depend on the channel access priority. In the second category, a node may sense the channel for a pre-configured number of slots.

For communications between a WTRU and a network node, interference may occur when other nodes (for example, WiFi transmitters) also communicate with the network node using the unlicensed spectrum, and the other nodes are not in the sensing range of the WTRU while the WTRU is close to the network node. Such interference, commonly known as the "hidden node problem" may be resilient to LBT procedures as one WTRU may be unable to sense transmissions by the other. To mitigate the hidden node problem, the contention window may be adjusted prior to each transmission considering the state of the last transmission. For example, the state of the last transmission may be indicated to the network via an acknowledgment (ACK) or negative acknowledgement (NACK) received for a downlink transmission, or a new data indicator (NDI) may be toggled in case of uplink transmission. An ACK or NACK may generally be referred to as HARQ-ACK feedback. In one example implementation of an LBT procedure for downlink transmissions, if at least 80% of HARQ-ACK values of PDSCH transmissions in reference subframe are NACKed, the CWS may be increased; otherwise it remains unchanged. For uplink transmission, a WTRU may increase the CWS based on whether NDI is toggled for a reference HARQ ID. The reference HARQ ID may correspond to a grant transmitted in a reference subframe.

SUMMARY

Method and apparatuses for communication over an unlicensed band are provided herein. A method may comprise transmitting transport blocks in each slot of a plurality of slots and determining a Hybrid Automatic Repeat Request (HARQ) status for each of the transmitted transport blocks. The method may further comprise determining a weighting coefficient for each of the determined HARQ statuses and calculating, based on the determined HARQ statuses and weighting coefficients, a weighted average of the HARQ statuses for the transmitted transport blocks. The method may further comprise adjusting a Listen-Before-Talk (LBT) contention window size based on the calculated weighted average of the HARQ statuses.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
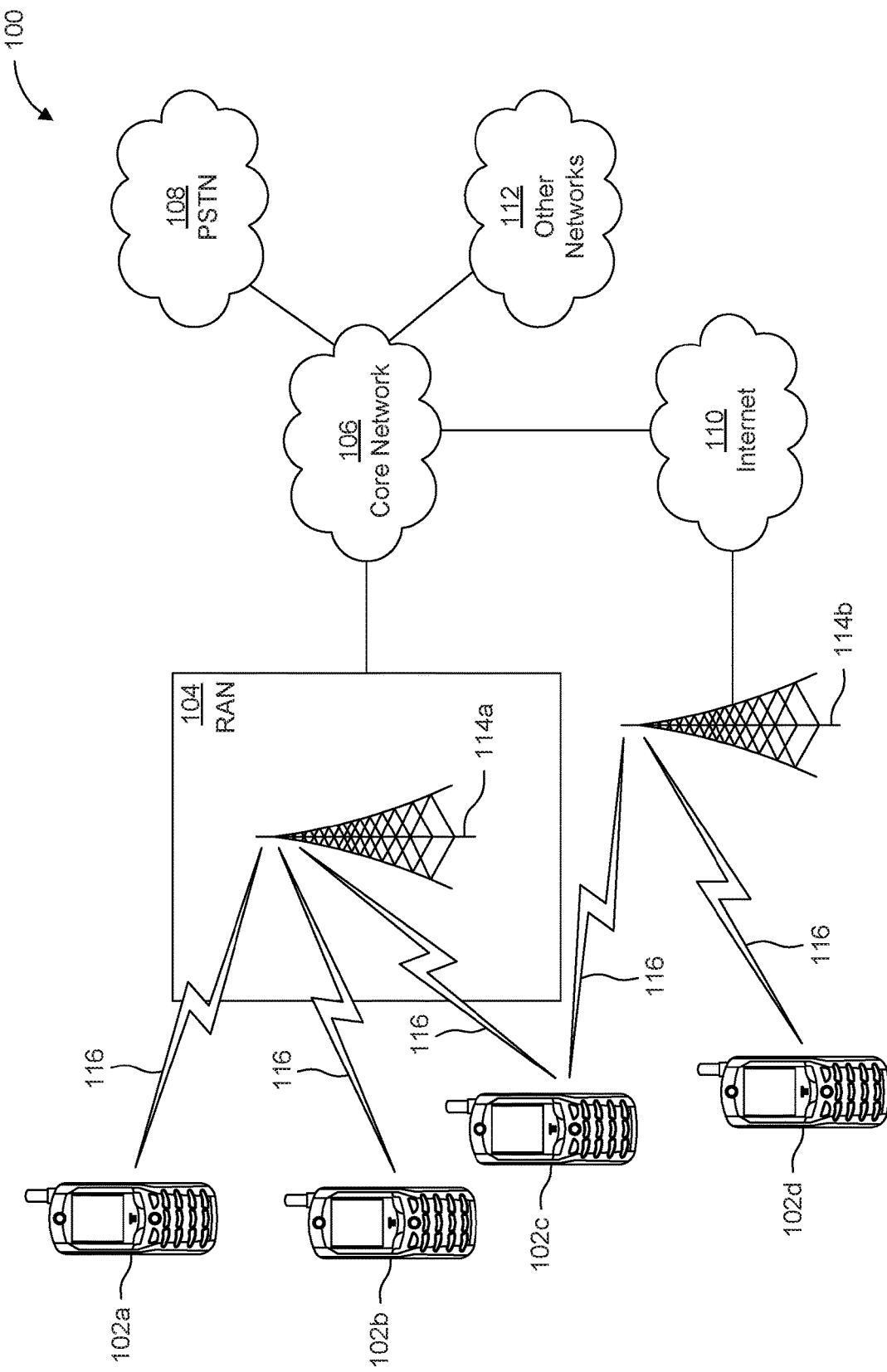
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
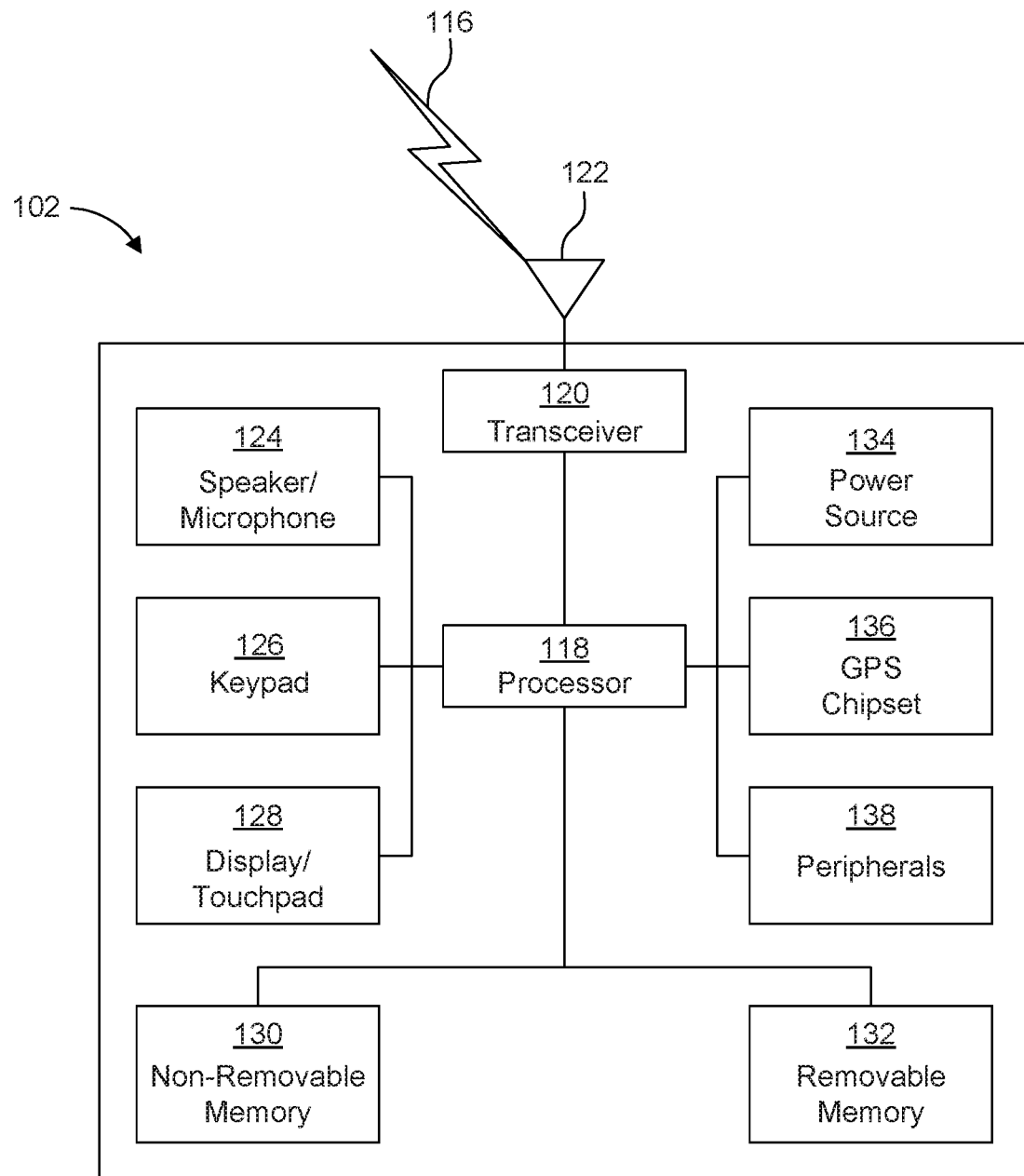
FIG. 1B is a system diagram illustrating an example wireless transmit/receive unit (WTRU) that may be used within the communications system illustrated in FIG. 1A according to an embodiment.
Figure 1C:
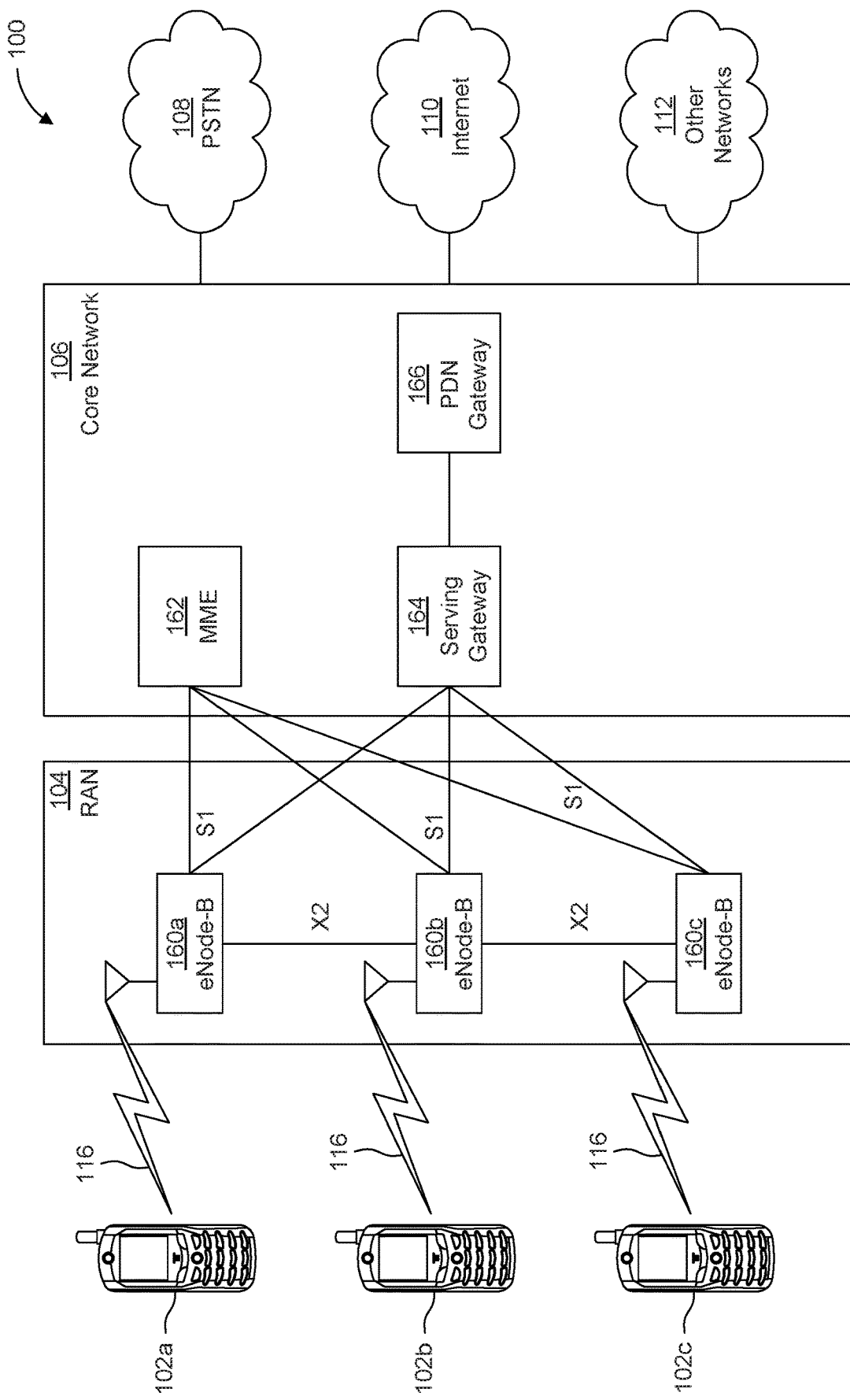
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
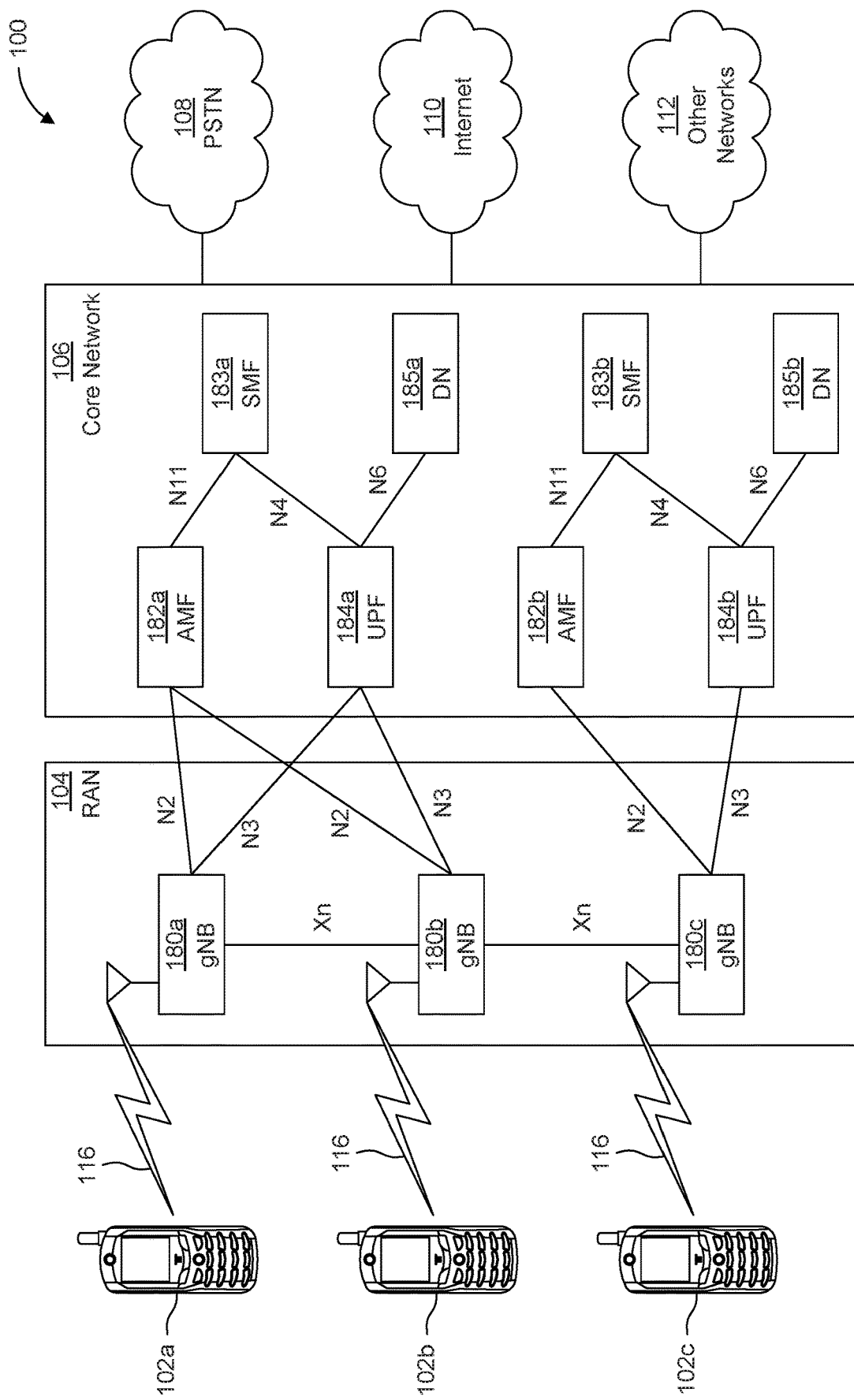
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

3GPP has released standards for New Radio (NR) technology. Unlike LTE, NR may support variable transmission duration/starting symbols and variable HARQ feedback timing. In a variable transmission duration, a physical downlink shared channel (PDSCH) or physical uplink shared channel (PUSCH) transmission may occupy a contiguous set of symbols within a slot. When variable feedback timing is implemented, downlink control information (DCI) containing a DL assignment may include an indication of the HARQ feedback timing for the WTRU. For instance, the indication may identify a semi-statically configured time period in which to transmit the HARQ feedback. Furthermore, NR may support the use of a dynamic HARQ-ACK codebook for which the size of the codebook depends on the number of scheduled transport blocks (TBs). A Next Generation Node B (gNB) may use a counter downlink assignment index (DAI) and/or total DAI in the DCI to indicate the number of previously scheduled TBs. In one embodiment, the counter DAI and total DAI indicators may each or collectively have a size of two bits, which may allow a WTRU to recover up to four missing TBs. In other embodiments, the counter DAI and total DAI indicators may each or collectively have greater or lesser numbers of bits, and may allow the WTRU to recover a greater or lesser number of bits.

3GPP has started a work item to support NR operation in unlicensed bands. One objective of the work item may be to specify NR-based operation in unlicensed spectrum including initial access, scheduling/HARQ, and mobility, along with coexistence methods for operation alongside LTE-LAA and other incumbent radio access technologies (RATs). Deployment scenarios may include different standalone NR-based operations. For example, variants of dual connectivity operation may be implemented, such as E-UTRAN New Radio Dual Connectivity (EN-DC) with at least one carrier operating according to the LTE RAT or NR DC with at least two sets of one or more carriers operating according to the NR RAT. Variants of carrier aggregation (CA) may also be implemented, possibly including different combinations of zero or more carriers for each of the LTE and NR RATs.

During the study item phase, it was agreed to support, for example, four categories of channel access schemes for NR-U operations. Category 1 channel access may involve immediate transmission after a short switching gap. Category 2 channel access may involve LBT operation without random back-off, while Categories 3 and 4 may respectively include LBT operations with random back-off and a fixed Contention Window Size (CWS) and Listen-Before-Talk (LBT) operations with random back-off and a variable contention widow size.

NR-U may also support the possibility of disabling the transmission of HARQ-ACK feedback temporarily for a given PDSCH transmission, with the possibility of requesting the HARQ-ACK feedback later using a DCI without scheduling a transport block (TB).

In LTE-based operations within the unlicensed spectrum, an evolved NodeB (eNB) may rely on the indicated status of one or more PDSCH transmissions in order to adjust the CW. Prior to a transmission on a PDSCH, the eNB may maintain a CWS associated with a channel access priority class p. By determining HARQ-ACK values corresponding to one or more PDSCH transmissions in a reference subframe, the CWS may be increased or decreased. The reference subframe may be the starting subframe of the most recent transmission performed on the carrier by the eNB, and for which HARQ-ACK is expected to be available. In LTE, the HARQ-ACK feedback is transmitted on the licensed spectrum and it is not subject to CCA success or failure. For uplink transmissions, a WTRU may adjust the CWS based on the new data indicator (NDI) of the recent uplink transmission. One problem posed by the additional procedures in NR is that the HARQ-ACK feedback in NR-U can be transmitted on an unlicensed spectrum. Thus, the availability of the HARQ-ACK status of the last transmission(s) at the gNB may not be guaranteed.

Figure 2:
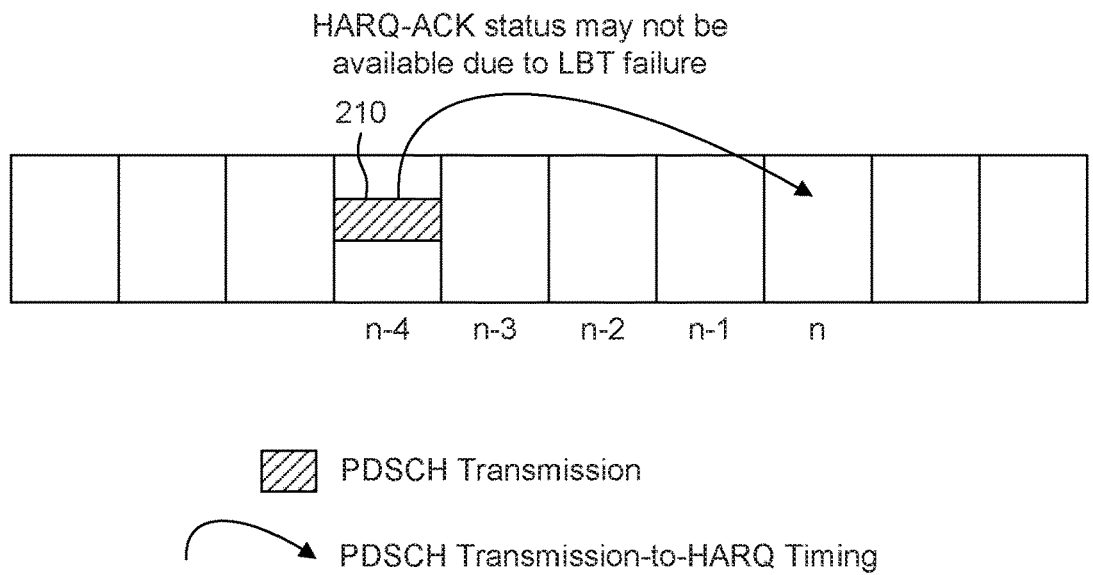
FIG. 2 depicts the timing of scheduled HARQ feedback in relation to a corresponding PDSCH transmission.

FIG. 2 depicts the timing of scheduled HARQ feedback in relation to a corresponding PDSCH transmission. As shown, a gNB may transmit a transport block over a PDSCH 210 in slot n-4 and schedule transmission of HARQ-ACK feedback by the WTRU in slot n. Due to LBT failure, the HARQ-ACK status of that PDSCH may not be available in slot n-4 as expected. At the gNB, it may not be clear whether the PDSCH transmission was not received by the WTRU or whether the HARQ-ACK transmission failed because of the WTRU's LBT mechanism. It may not be evident whether, for example, the hidden node problem or a collision occurred during transmission over the PDSCH. In yet another example, the PUCCH resource indicated by the PDSCH-to-HARQ parameter may fall outside of the Channel Occupancy Time (COT). In the latter case, similar to the LBT failure, the HARQ-ACK status of the corresponding PDSCH will not be available at least until a new COT is established.

Another problem may be that the support of flexible HARQ timing, for instance, dynamic indication of PDSCH-to-HARQ, may result in multiple PDSCH transmissions occurring in the same slot, and may result in signaling of HARQ-ACK feedback in different slots. Different HARQ-ACK feedback arriving in different slots may experience different channel conditions.

Figure 3:
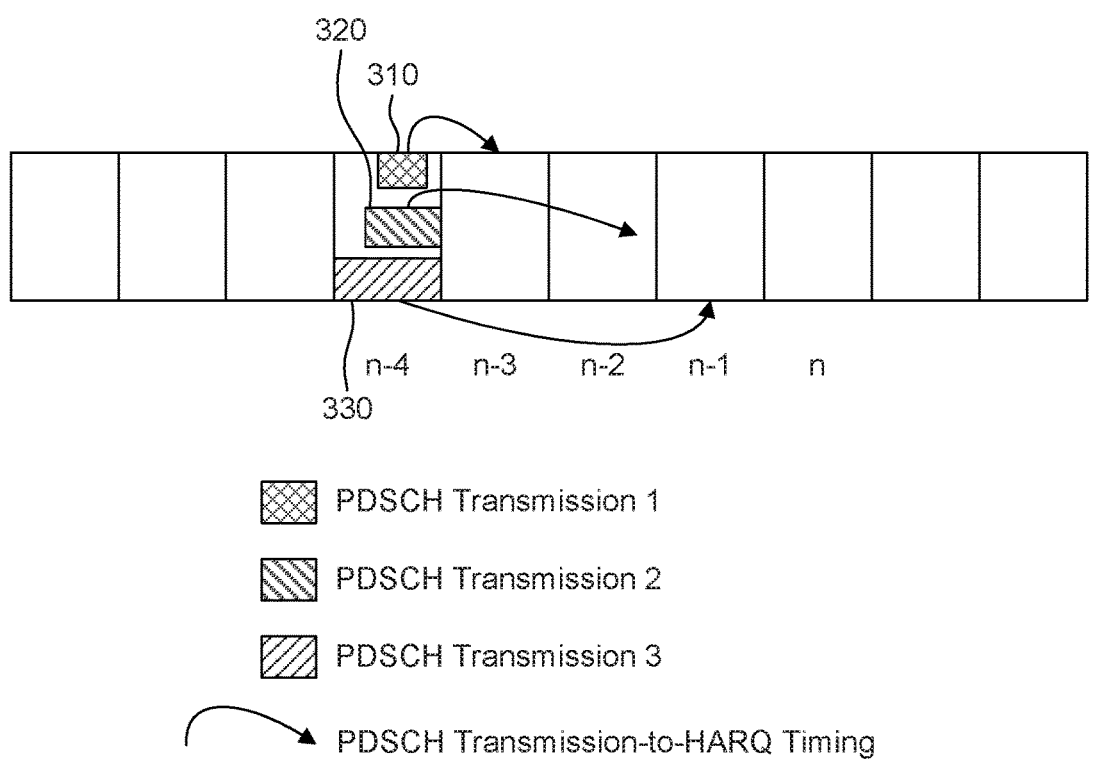
FIG. 3 illustrates scheduling of HARQ-ACK feedback with varied timing as may be implemented in NR.

FIG. 3 illustrates scheduling of HARQ-ACK feedback with varied timing as may be implemented in NR. For example, for three separate PDSCH transmissions 310, 320, and 330 that are transmitted in slot n-4, HARQ-ACK feedback for each arrives in slots n-3, n-2 and n-1 respectively as shown. The transmissions for the three HARQ feedback may experience different channel conditions and may be subject to LBT failure or success. Furthermore, as shown in FIG. 3, the PDSCH transmission duration within the slot n-4 may be different. Short transmissions may experience different channel conditions than longer transmissions. Also as shown, the starting times and/or ending times of PDSCH transmissions in a given slot may also vary.

Methods and apparatuses are described herein for adjusting the CWS. These solutions may consider, for example, the uncertainty of HARQ-ACK statuses of previous transmissions at the transmitter side as well as the variable duration and the timing of a transmission. As used herein, the term "transmitting node" may refer to a WTRU, a WTRU, a gNB, or any transmitter for wireless communication. Such equipment may be configured to operate, for instance, in the NR unlicensed spectrum.

Embodiments directed to CW adjustment generally are disclosed herein. In one set of solutions, a transmitting node may be configured with a set of values from which the CW can be changed. For example, a transmitting node can be configured with a set of values $S=\{W_1, W_2, \ldots, W_N\}$. The contention window adjustment procedures may include increasing the window size by one or multiple steps (e.g. from $W_1$ to $W_2$ or from $W_1$ to $W_k$ such that k<=N), reducing the size by one step or multiple steps (e.g. from $W_2$ to $W_1$ or from $W_k$ to $W_1$ such that k<=N) and/or resetting the window size to a default value. In one example solution, a default value can be the smallest value of the set or alternatively, a default value can be pre-configured or fixed in the specification or dynamically determined. A transmitting node may determine the adjustment step and/or the initial value of the contention window based on one or a combination of factors described as follows. For example, a transmitting node may determine the initial value and/or the adjustment step based on another transmitting node-initiated COT duration. A WTRU may determine the initial value of the CWS based on the COT duration as initiated by a gNB.

In some embodiments, the adjustment step and/or initial value of the CW may depend on a channel access priority. For example, a WTRU may determine the step and the initial value based on the channel access priority signaled from the network.

In some embodiments, the adjustment step and/or initial value of the contention window may depend on a signal and/or the channel to be transmitted. For example, a WTRU can select the smallest value from the set of allowed values if the WTRU is transmitting a scheduling request or HARQ-ACK feedback.

In some embodiments, the adjustment step and/or initial value of the contention window may depend on the number of contention window adjustments performed previously by the transmitting node.

In some solutions, a transmitting node may be configured to adjust the contention window corresponding to a given channel access priority (CAP) based only on a previous transmission or transmissions performed having that channel access priority. For example, a transmitting node can be configured to perform multiple channel access with different priority classes. A transmitting node may adjust the CWS by determining the status of a previous transmission that was performed using that channel access priority.

In other solutions, a transmitting node may be configured to adjust the CWS corresponding to a given channel access priority based on a previous transmission or transmissions performed having a channel access priority within a subset of classes for the same channel access category. For example, a transmitting node may be configured to use a channel access category with four different priority classes p1, p2, p3, and p4. A transmitting node may adjust the CWS for a CAP based on a mapping of channel access priorities shown in Table 1, which depicts an example mapping between a single CAP and transmissions of other CAPs.

TABLE 1

Mapping between single CAP and CAP subsets

| CAP | Mapped CAP subsets to consider in CWS adjustment |
|---|---|
| p1 | p1 |
| p2 | p1, p2 |
| p3 | p1, p2, p3 |
| p4 | p1, p2, p3, p4 |

In this example, to adjust the CW size for a transmission having channel access priority p1, the node may only consider the state of a previous transmission or transmissions that having a channel access priority p1. For priority p4, the node may consider all the transmissions having different channel access priorities p1, p2, p3, and p4 in order to adjust the contention window. Such mapping can be semi-statically configured, using higher layer signaling, or dynamically indicated by the receiving node, using for example a DCI (in case the transmitting node is a WTRU and the receiving node is a gNB) or a sequence-based signal.

In other solutions, a transmitting node may group the transmission status based on the service type of the transmission and adjust the CWS per type of service. For example, a transmitting node may consider only the HARQ-ACK status of URLLC-type service when performing the CW adjustment to transmit a URLLC packet.

In some solutions, a transmitting node may be configured to adjust the CW of a given channel access category based only on a previous transmission or transmissions performed which used that channel access category. For example, a transmitting node can be configured to use a single multiple channel access category. A transmitting node may adjust the CW by determining the status of the previous transmission that was performed using that channel access category. In another solutions, a transmitting node may be configured to adjust the CW of a given channel access category based on a previous transmission or transmissions performed using a subset of channel access categories. A transmitting node may be configured with a mapping between a single channel access category and a set of channel access categories to be considered semi-statically using, for example, RRC signaling or dynamically using, for example, a DCI or a sequence-based signal.

In some solutions, a transmitting node may adjust the CWS based on one or a combination of parameters. For example, one parameter used to adjust the CWS may be a HARQ-ACK status of one or more PDSCH or PUSCH transmissions received in a reference subframe or a set of reference subframes. Another parameter may be a HARQ-ACK status of a PDSCH or PUSCH transmission performed in a reference subframe.

A transmitting node may adjust the CWS based on one or more measurement reports or measurements results. A measurement report or result may include a Channel Quality Indicator (CQI) range; a Channel State Information (CSI); an SRS transmission; an SINR estimation over a set of slots preceding a transmission or transmissions; an energy sensed over a set of slots preceding the transmission or transmissions; radio link quality measurements (e.g., Radio Link Monitoring (RLM)); received power measurements for a layer 1 reference signal received power (L1-RSRP); received CSI reference signal power (CSI-RSRP); a received CSI reference signal quality (CSI-RSRQ); beam related measurements; numerology (e.g., subcarrier spacing); a received signal strength indicator (RSSI); or Channel Occupancy (CO). A CO may be determined, for example, per LBT subband as a function of the channel load.

A transmitting node may adjust the CW based on the number of slot durations N sensed during a previous CW adjustment. The adjustment may be made based on a number of slots in which the channel was determined to be free, for instance, those in which the energy detected was below a certain threshold. The adjustment may also be made based on the number of slots in which the channel was determined to be busy, such as those in which the energy detected was above a certain threshold. The adjustment may be based on the sum of the number of free and clear slots and/or the number of times the LBT procedure was deferred. The adjustment may also be based on the total time for one or more previous LBT procedures, and/or based on the average amount of time for a set of previous LBT procedures.

In some solutions, a transmitting node may be configured to perform the CW adjustment process per sub-band within the active bandwidth part (BWP). For example, a transmitting node may operate on a wide bandwidth part (WBWP) which have multiple sub-bands and perform LBT procedures per sub-band. The node may perform channel access procedures per a frequency size equal to 20 Mhz. For example, if a transmission fails in the first sub-band, the second sub-band CW may not be increased. In a first set of solutions, a transmitting node may adjust the CW process independently from other CW adjustment processes. In another set of solutions, a transmitting node may adjust the CW process considering the state or states of other CWS processes. For example, a transmitting node may consider the CW process state of an adjacent sub-band if the frequency offset between the two sub-bands is less than a threshold.

In some solutions, a transmitting node may be configured to maintain a CW adjustment process per BWP assuming multiple BWPs are configured within the carrier. In such cases, a transmitting node may adjust one CW adjustment process independently from other CW adjustment processes corresponding to different BWPs.

In some solutions, a transmitting node may acquire a set of LBT sub-bands for transmission, which may reside within a BWP. The transmitting node may use a wideband LBT covering all the LBT sub-bands and may use a CWS process that is applicable to all LBT sub-bands. In another method, the wideband CWS value may be determined as a function of all the CWS values of each independent LBT sub-band. In another method, the transmitting node may perform multiple LBT procedures (for instance, one procedure per LBT sub-band) and may use independent CW adjustment processes for each independent LBT sub-band. In yet another method, the transmitting node may perform multiple LBT procedures and may use a single CWS value, possibly determined as a function of all the CWS values of each independent LBT subband.

When the WTRU uses a CWS value that is a function of a set of CWS values determined from a set of LBT sub-bands, the function may be composed of at least one of several elements. For example, the used CWS value may be the largest or smallest CWS value of all the LBT sub-bands under consideration. The used CWS value may be an average CWS value determined from the CWS values of all the LBT sub-bands under consideration. The used CWS value may be the CWS value of the LBT sub-band with highest or lowest index. The used CWS value may be the CWS value of an LBT sub-band that may be configurable or indicated by the network. The used CWS value may be a CWS value that is configurable for the set of LBT sub-bands, or indicated by the network. The used CWS value may be the most recently used CWS for any LBT sub-band within the BWP, or the used CWS value may be an adjustment (e.g. an increment increase or decrease from a previously used value).

A CWS used for a set of LBT sub-bands may be stored within, or reserved for use with one or all of the CWS processes corresponding to each LBT sub-band. Any such stored CWS or CWSs may be used in a subsequent LBT procedure. In another method, the CWS used for a set of LBT sub-bands may be stored in a CWS process to be used for any future use of that specific set of LBT sub-bands.

In some solutions, a transmitting node may adjust the CWS based on assistance information received from the receiving node. For example, a WTRU may adjust its CWS based on information received from the gNB. Such information can be explicitly signaled, for example via a field in DCI, or implicitly derived from other received signals such as RRC-configured parameters. For example, in case of the gNB transmitted a sequence based-signal to indicate the starting of shared COT, the sequence used by the gNB may indicate the CWS and/or the initial value to be used by a WTRU when adjusting the CWS. In another example, the sequence used can indicate whether a CWS adjustment is needed or not.

In yet another embodiment, the WTRU may use the information such as a set of PDCCH monitoring occasions, Control Resource Set (CORESET), or search space attributes to determine the information for the CWS adjustment.

In some solutions, the transmitting node and the receiving node can coordinate to maintain the same CW. Such coordination can be supported by exchanging the CWS information explicitly or implicitly. For example, a WTRU may receive the CWS to be used for an uplink transmission within the scheduling DCI. In another example, a WTRU may implicitly determine the CWS used by the receiving node.

In some solutions, the transmitting node may need to take into account the numerology, for instance subcarrier spacing, slot duration, CP length, etc., to adjust the CW. In one example, the WTRU may detect a DCI switching a DL BWP. If the active DL BWP and the initial DL BWP have different subcarrier spacings (SCSs) and different CP lengths, the WTRU may need to consider the numerology of the initial BWP for CW adjustment on the active BWP. In one example, if the previous CW size adjustment was based on the sensing of N slot durations with subcarrier spacing of 15 KHz in the initial BWP, the WTRU may need to consider sensing 2N slot durations with subcarrier spacing of 30 KHz in the active BWP given that the slot duration in the active BWP is half of the initial BWP.

The proposed solutions in the sections above may apply alone or in combination with proposed contention window adjustment solutions for uplink and downlink transmissions that follow.

Embodiments directed to contention window adjustment for uplink transmissions are described herein. Uplink transmissions may include any transmission generated by a WTRU. As an example, and without limitation, it may include transmissions using a PUCCH, PUSCH, PRACH, or SRS. The following proposed solutions may be applied alone or in combination. For uplink transmissions, a WTRU can be configured to determine the HARQ-ACK status of a previous transmission or transmissions based on explicit HARQ-ACK feedback from the gNB or based on NDI toggling of those HARQ IDs used in the uplink grant of subsequent transmissions.

In a first set of solutions, a WTRU may be configured to consider the HARQ-ACK status of PUSCH transmissions within a configured time window or within a set of slots prior to CW adjustment procedures. The time window size may be associated with a certain channel access category or a channel access priority. A WTRU may be configured to group HARQ-ACK statuses corresponding to multiple transmissions, average the HARQ-ACK values within a group and determine a weighted average across the group. The WTRU may apply a weighting coefficient to each of the HARQ-ACK values for individual slots or sets of slots. A WTRU may be configured to group the HARQ-ACK statuses of uplink transmissions or may autonomously do so based on one or more of several factors, as described herein.

Figure 4:
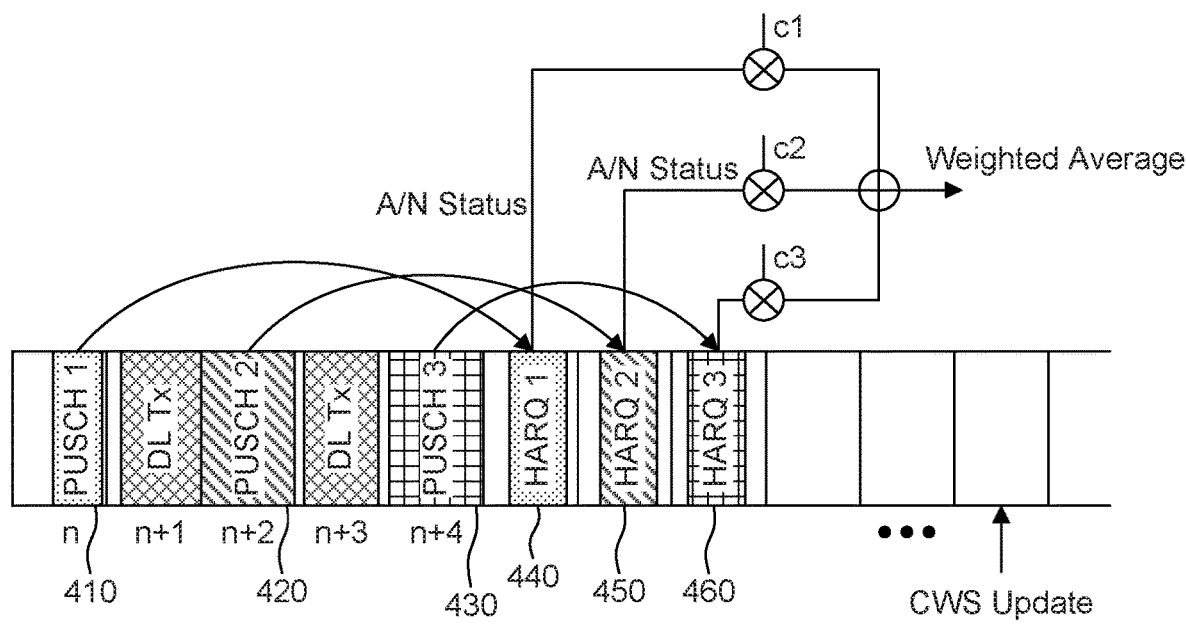
FIG. 4 shows an example of a grouping and adjustment procedure as performed by a WTRU.

FIG. 4 shows an example of a grouping and adjustment procedure as performed by a WTRU. As shown, a WTRU may determine to group the HARQ-ACK status based on the duration of a PUSCH transmission or transmissions and/or the position of the PUSCH transmission within a window prior to CW adjustment procedures. As shown in FIG. 4, a WTRU may be configured to transmit a series of transmissions over a PUSCH in a set of reference slots n through n+4. A first transmission 410 may be transmitted by the WTRU in slot n, a second transmission 420 may be transmitted by the WTRU in slot n+2, and a third transmission 430 may be transmitted by the WTRU in slot n+4. PUSCH transmissions 410, 420, and 430 may have different durations and/or different starting times as shown. HARQ-ACK statuses may be received at the WTRU from a network node as shown at 440, 450, and 460. The WTRU may group the information, averaging the values of the HARQ-ACK statuses corresponding to the HARQ-ACK feedback 440, 450, and 460 for the PUSCH transmissions 410, 420, and 430. In some embodiments, the WTRU may apply weighting coefficients to any or all of the determined HARQ-ACK statuses, shown in FIG. 4 as C1, C2, and C3.

Described herein are factors upon which the a WTRU may determine to group the HARQ-ACK statuses. In some embodiments, for example, a WTRU may determine to group the HARQ-ACK statuses based on whether a grant-based PUSCH transmission occurred or whether a configured grant was transmitted.

In some embodiments, the WTRU may determine to group the HARQ-ACK statuses based on a channel access category or priority, or the WTRU may determine to group the HARQ-ACK statuses based on an LBT category or priority used by the gNB to schedule the grant. The WTRU may determine to group the HARQ-ACK statuses based on a CORESET or a search space on which the DCI scheduling the transmission or transmissions was received. The WTRU may determine to group the HARQ-ACK statuses based on a monitoring periodicity of the search space on which the DCI scheduling the transmission was received. In some embodiments, the WTRU may determine to group the HARQ-ACK statuses based on a transmission configuration indicator (TCI) state on which the DCI scheduling the transmission was received. The WTRU may determine to group the HARQ-ACK statuses based on a bandwidth part on which the DCI scheduling the transmission was received.

A WTRU may determine to group the HARQ-ACK statuses transmitted by gNB based on some a priori knowledge, such as knowledge of a discontinuous transmission (DTX) at the gNB due to an LBT procedure failure at the WTRU, a DTX at the gNB due to the misdetection of the PUSCH, PUSCH transmission attributes such as the MCS, redundancy version (RV) or a number of repetitions, or HARQ process information such as a HARQ ID.

In some solutions, a WTRU may receive configuration information from the network with weighted average coefficients for each group. For example, a WTRU may receive an RRC configuration that associates a coefficient with each group. In another solution, a DCI scheduling a transmission can indicate the coefficients for that group of transmissions. In another solution, a WTRU can autonomously determine the coefficients of the weighted average, for example, based on the type of traffic scheduled within the group. The WTRU may apply a weighting coefficient across a group of HARQ-ACK values, or, as described above, the WTRU may apply a weighting coefficient to each of the HARQ-ACK values for individual slots or sets of slots.

Figure 5:
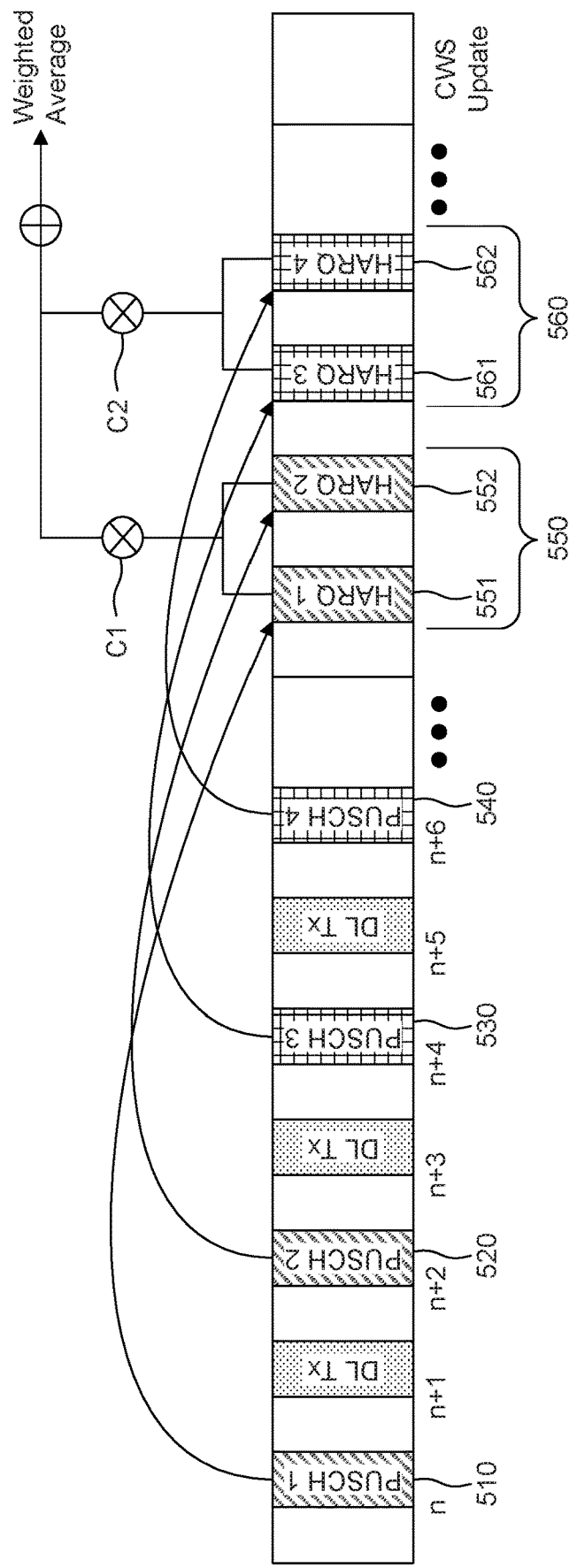
FIG. 5 depicts an example scenario in which a WTRU is configured to group the HARQ-ACK statuses corresponding to a series of PUSCH transmissions.

FIG. 5 depicts an example scenario in which a WTRU is configured to group the HARQ-ACK statuses corresponding to a series of PUSCH transmissions. As shown, the WTRU may transmit a series of transmissions over a PUSCH in a set of reference slots n through n+6. A first transmission 510 may be transmitted by the WTRU in slot n, a second transmission 520 may be transmitted by the WTRU in slot n+2, a third transmission 530 may be transmitted by the WTRU in slot n+4, and a fourth transmission 540 may be transmitted by the WTRU in slot n+6. PUSCH transmissions 510, 520, 530, and 540 may have different durations and/or different starting times. In subsequent slots, the WTRU may receive HARQ feedback or determine HARQ-ACK statuses 551, 552, 561, and 562 corresponding to each of the PUSCH transmissions 510, 520, 530, and 540. The HARQ-ACK statuses 551, 552, 561, and 562 may comprise single bit values of 0 or 1, and may be received by the WTRU from a network node. Alternatively, the HARQ-ACK statuses may be determined implicitly based on the toggling of a NDI field in a DCI. The WTRU may group the HARQ-ACK feedback into groups 550 and 560, for example, according to one or more of the factors described in paragraphs above, and the WTRU may average the values of the HARQ-ACK statuses for each of the groups. In embodiments as shown, the WTRU may also apply weighting coefficients to each of the groups of HARQ-ACK statuses, shown by C1 and C2.

In some solutions, a WTRU may be configured to adjust the CWS considering per-CBG HARQ-ACK status. In a first set of solutions, a WTRU may be configured to consider the per-TB HARQ-ACK statuses and per-CBG HARQ-ACK statuses differently. For example, the WTRU may perform a weighted average across all the HARQ-ACK statuses with lower weights assigned to per-CBG HARQ-ACK statuses. In other solutions, a WTRU may be configured to assign the same weight for both per-TB and per-CBG HARQ-ACK statuses, for example, if the gNB maps a CBG to an entire sub-band. Upon receiving the uplink grant and determining that a CBG maps to an entire sub-band, the per CBG HARQ-ACK status can give the WTRU the channel condition of the entire sub-band. A WTRU can be configured to determine the HARQ-ACK status of a CBG using the CBG transmission indication and/or CBG flushing indication received in the DCI scheduling the UL grant.

In some solutions, a WTRU may adjust the contention window size based on a channel quality indicator (CQI) determination in a reference slot, within a set of slots, or within a configured time window prior to performing CW adjustment procedures. For example, a WTRU can be configured to calculate the average value of CQIs determined over K slots prior to the CW adjustment. In some embodiments, a WTRU can be configured to calculate a weighted average of the CQIs. For example, a WTRU can be configured to apply a higher coefficient to the latest determined CQI than to an earlier CQI. Furthermore, a WTRU can be configured with a set of CQI average thresholds, and each threshold may correspond to a step or steps of a contention window adjustment process. For example, a WTRU can be configured with $\{T_1, T_2, \ldots, T_N\}$ thresholds. If the calculated average is between $T_i$ and $T_{i+1}$, the CWS may be increased by one step, and if the calculated average is between $T_{i+1}$ and $T_{i+2}$, the CWS may be increased by two steps.

In a solution, a WTRU may be configured with a CWS based on a measurement received in a configured reference signal or another signal. The measurement may be in form of pathloss, an estimated SINR, or another metric related to signal quality or signal strength.

A WTRU may be configured with one or more thresholds and one or more CWS values by which to determine the applicable CWS. The determination may be made based on a WTRU measurement or directed by the gNB.

Figure 6:
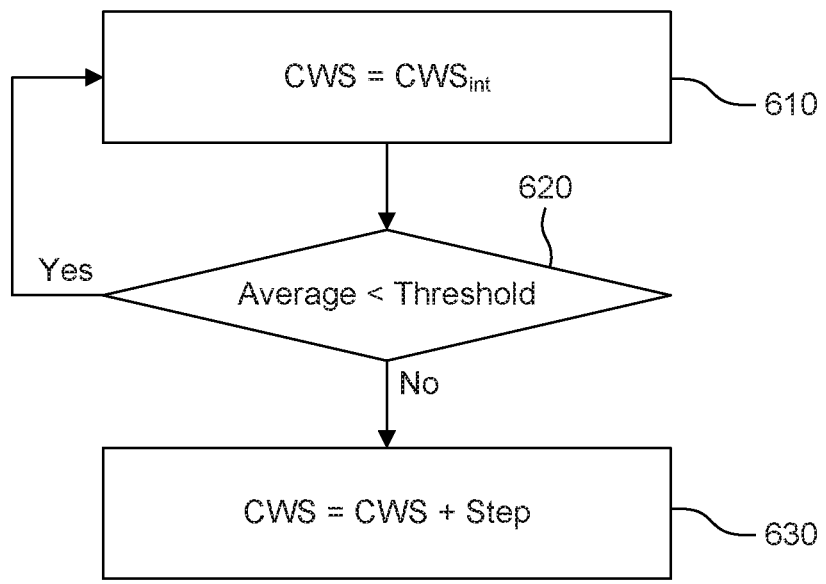
FIG. 6 is a flowchart depicting an example process by which a WTRU adjusts a CWS using a threshold value.

FIG. 6 is a flowchart depicting an example process by which a WTRU adjusts a CWS using a threshold value. As shown, at 610, a WTRU may be configured with an initial CW size and one or more threshold values. The initial CW size and/or the threshold value may be configured via semi-static signaling or determined dynamically. At 620, the WTRU may calculate an average value or a weighted average value of a plurality of HARQ statuses, for example, according to a method described above. In the event the average value or weighted average value of the HARQ statuses is less than the threshold, the WTRU may determine to maintain the CW at the initial CWS. In the event the calculated average is equal to, or exceeds the threshold value, the WTRU may determine to increase the CWS by applying a CWS adjustment step, shown at 630. For example, as described in paragraphs above relating to CW adjustment generally, the WTRU may be configured with a set of adjustment steps S={$W_1$, $W_2$, . . . , $W_N$}. In some embodiments, for instance, the WTRU may apply successive adjustment steps $W_1$ or $W_2$ depending on the number of adjustments previously performed. In another embodiment, the WTRU may apply successive adjustment steps depending on whether the calculated average or weighted average exceeds further threshold values beyond the first.

In a solution, a WTRU may be configured to determine the CWS based on a downlink measurement, for example, a pathloss calculation, RSSI, radio resource management (RRM) parameter, or a CO value, any of which may be used to estimate the uplink SINR. In some embodiments, a WTRU may be configured with two threshold values $T_1$ and $T_2$, along with three CWS values. As such, based on a CQI estimate, the WTRU may select one of the three preconfigured CWS values by comparing the estimated CQI to the configured thresholds.

In an alternative solution, a WTRU may be configured to determine the CWS based on another configured parameter, such as an MCS for a scheduled uplink transmission. In one case, a WTRU may be configured with, for example, two threshold values $T_1$ and $T_2$, along with three CWS values. Based on the configured MCS for a recent or immediate scheduled uplink transmission, a WTRU may select one of the three preconfigured CWS values, for example, by comparing the configured MCS to the configured thresholds.

In some solutions, a WTRU can adjust the contention window size based on a gNB's COT characteristics. For instance, depending on the COT duration of the gNB, a WTRU can adjust the CWS accordingly. If the gNB's COT duration is relatively large (for example, 10 ms), to ensure fairness among nodes using other RATs such as a wireless local area network (WLAN), a WTRU may be configured to increase the CWS during the access channel procedures.

Embodiments directed to CW adjustment for downlink transmissions are described herein. A downlink transmission or transmissions may include any transmission generated by a gNB. As an example, and without limitation, it a downlink transmission may include a transmission using a PDCCH, a PDSCH, a PBCH, PSS/SSS, a DMRS or a CSI-RS. The following proposed solutions may be applied either alone or in combination.

In some solutions, a gNB may adjust the contention window size of a transmission or transmissions based on the HARQ-ACK status of a previous transmission or transmissions performed within a reference slot or slots. In one group of solutions, a gNB may group the HARQ-ACK feedback based on the arrival time of each ACK/NACK feedback. For instance, each HARQ-ACK that arrives in the same time instance or within the same sub-slot or within the same slot may be associated with the same group. Such feedback may be deemed to share the same HARQ-ACK timing.

In one example solution, a group of NACKs having the same HARQ-ACK timing may be averaged. A weighted average can then be calculated from the averages obtained for each HARQ-ACK timing. The weights applied for each HARQ timing group can be configured semi-statically or dynamically adapted based on the WTRU's measurements reports. In one scenario, the gNB may adjust the CWS if the weighted average is above a configured threshold.

Alternatively, the gNB may be configured with a set of weighted average thresholds, each one corresponding to a CW adjustment step. In a corresponding scenario, a gNB may attempt to access a channel in slot n, and a reference slot may have relative timing of n-3. The gNB may have performed $M_1$ PDSCH transmissions in slot n-3 for which it expects feedback in slot n-2. The gNB may also have performed $M_2$ PDSCH transmissions in slot n-3 for which it expects feedback in slot n-1. Finally, the gNB may have performed $M_3$ PDSCH transmissions in slot n-3 for which is expecting feedback in slot n. In this example, the weighted average can be calculated as follows:

For each group $M_i$, $$m_i = \frac{\text{number of received ACK within slot } (n-3+i)}{M_i},$$

and the weighted average may equal to $\Sigma_1^3 c_i m_i$, where $0 \leq c_i \leq 1$.

In another solution, a gNB may group HARQ-ACK feedback based on the duration of the PDSCH transmission or transmissions and/or based on the position of the PDSCH transmission within a slot. The values of each HARQ-ACK associated with a certain starting position and/or duration may be averaged. A weighted average may then be calculated among the average obtained for each HARQ-ACK group. The weight of each HARQ group can be configured semi-statically or dynamically adapted based on any of the above-mentioned downlink measurements reported by the WTRU.

In a set of solutions, to adjust the CW, a gNB may consider a status of HARQ-ACK feedback transmitted by WTRUs that used a certain channel access category and/or priority. In one example, a gNB may consider HARQ-ACK statuses from WTRUs that used a channel access category stipulating immediate transmission after a short switching gap. In another example, a gNB may consider HARQ-ACK statuses from WTRUs that used a channel access category without random back-off. In another example, a gNB may group the HARQ-ACK statuses based on the channel access category used by WTRUs. A weighted average may be calculated among the groups with each group having a different weight. For example, a group of HARQ-ACK statuses from of WTRUs that used a channel access category with immediate transmission after a short switching gap can have higher weight compared to HARQ-ACK feedback from WTRUs who performed channel access without random back-off.

In other solutions, a gNB may consider HARQ-ACK feedback that is triggered by a DCI rather than scheduled. For example, these solutions may apply if the gNB schedules a transport block without providing the HARQ-ACK timing and later triggers, in a subsequent slot, for example, transmission of HARQ-ACK feedback corresponding to the scheduled transport block. Such HARQ-ACK feedback may have a higher priority or weighting coefficient when used to calculate a weighted average.

In some solutions, a gNB may determine that a NACK has been indicated for a given transmission based on one or more conditions. In one example condition, the gNB may simply receive a NACK from a WTRU. In another example condition, no HARQ-ACK feedback is received, or a DTX is detected for K number of slots and/or symbols. In another event, no HARQ-ACK feedback is received within a scheduled HARQ-ACK timeframe, but one or more uplink transmissions may be received from a WTRU in one or more subsequent slots or symbols. The uplink transmission may include a scheduling request, PRACH transmission, configured-grant PUSCH transmission, and/or a grant-based PUSCH transmission. In another condition, a number of received NACKs per CBG of a transport block may exceed a threshold.

In some solutions, a gNB may adjust the contention window size considering per-CBG HARQ-ACK statuses. In a first set of solutions, a gNB may consider per-TB HARQ-ACK and per-CBG HARQ-ACK statuses differently. For example, the gNB may perform a weighted average across all ACK/NACK values with lower weights assigned to the per-CBG HARQ-ACK feedback. In other sets of solutions, a gNB may assign the same weight to both a per-TB and per-CBG HARQ-ACK status. For example, a gNB may map a CBG to an entire sub-band. In such case, the per CBG HARQ-ACK status may indicate the channel condition of the entire sub-band.

In a solution, a WTRU may be configured with a CWS based on a measurement of a configured reference signal or another signal. The measurement may be in the form of SNR, SINR, CO, RSSI, or another metric. In some solutions, a gNB may adjust the CWS based on a WTRU's CQI reports received in a reference slot or measurements by WTRUs within a reference slot or in a set of slots prior to CWS adjustment. For example, a gNB may calculate the average CQI reported by different WTRUs within a reference slot or within a set of slots.

A WTRU may be configured with one or more thresholds and one or more CWS values to determine the applicable CWS. The determination may be based on a WTRU measurement or directed by the gNB.

In some solutions, a WTRU may be configured to determine the CWS based on a downlink measurement, such as a CSI-RS or a DMRS, and to estimate a downlink CQI or SINR. In one case, a WTRU may be configured with two threshold values $T_1$ and $T_2$, along with three CWS values. As such, based on its CQI estimate, a WTRU may select one of the three preconfigured CWS values by comparing the estimated CQI to the configured thresholds.

In an alternative solution, a WTRU may be configured to determine the CWS based on another configured parameter, such as an MCS for a scheduled transmission. In an exemplary case, a WTRU may be configured with two threshold values $T_1$ and $T_2$, along with three CWS values. Based on its configured MCS for a recent or immediate scheduled transmission, a WTRU may select one of the three preconfigured CWS values by comparing the configured MCS to the configured thresholds. In other cases, a greater or lesser number of threshold values and/or a greater or lesser number of CWS values may be implemented.

A WTRU may be configured to report the presence of a hidden node. The WTRU may determine the presence of a hidden node possibly as a function of an interference measurement. In another method, the WTRU may determine the presence of a hidden node based on past attempts by the WTRU to perform LBT procedures. For example, the WTRU may perform LBT procedures at configurable time instances and determine whether the channel is free from its point of view. The WTRU may then report such results, possibly in future transmissions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for communication over an unlicensed band performed by a Wireless Transmit/Receive Unit (WTRU), the method comprising:

transmitting one or more Physical Uplink Shared Channel (PUSCH) transmissions comprising a plurality of Transport Blocks (TBs);

receiving first Hybrid Automatic Repeat Request (HARQ) feedback for a plurality of Code Block Groups (CBGs) comprised in the first TB of the plurality of TBs, wherein the first HARQ feedback corresponds to CBG based HARQ feedback, a respective HARQ acknowledgement/negative acknowledgement (ACK/NACK) is received for each of a plurality of CBGs comprised in the first TB;

adjusting a contention window size (CWS) based on the first HARQ feedback corresponding to the plurality of CBGs, wherein the CWS is adjusted in accordance with a first rule based on the first received HARQ feedback corresponding to the CBG based HARQ feedback;

receiving a second HARQ feedback for a second TB of the plurality of TBs, wherein the second HARQ feedback corresponds to TB based HARQ feedback, and a single HARQ ACK/NACK is received for the second TB;

adjusting the CWS based on the second HARQ feedback corresponding to the second TB, wherein the CWS is adjusted in accordance with a second rule based on the second HARQ feedback corresponding to the TB based HARQ feedback, wherein the WTRU applies a greater weight to the single HARQ ACK/NACK received for the second TB when applying the second rule compared to a weight applied to each respective HARQ ACK/NACK for each of the plurality of CBGs when applying the first rule;

determining, based on the adjusted CWS, that a channel used to transmit at least a second PUSCH transmission is clear; and transmitting the second PUSCH transmission based on the determination that the channel is clear.

2. The method of claim 1, wherein at least one of the first or second received HARQ feedback is received within a time window.

3. The method of claim 2, wherein the time window is defined by a set of slots.

4. The method of claim 1, wherein the CWS is adjusted in accordance with the first rule based on applying a first weighting coefficient to the first received HARQ feedback corresponding to the CBG based HARQ feedback and comparing the weighted HARQ to a first threshold; and wherein the CWS is adjusted in accordance with the second rule based on applying a second weighting coefficient to the second received HARQ feedback corresponding to the TB based HARQ feedback and comparing the weighted second received HARQ feedback to a second threshold.

5. The method of claim 4, wherein the first weighting coefficient and the second weighting coefficient are different.

6. A Wireless Transmit/Receive Unit (WTRU), the WTRU comprising:
a transceiver configured to transmit one or more Physical Uplink Shared Channel (PUSCH) transmission comprising a plurality of Transport Blocks (TBs);
the transceiver further configured to receive first Hybrid Automatic Repeat Request (HARQ) feedback for a plurality of Code Block Groups (CBGs) comprised in the first TB of the plurality of TBs, wherein the first HARQ feedback corresponds to CBG based HARQ feedback, a respective HARQ acknowledgement/negative acknowledgement (ACK/NACK) is received for each of a plurality of CBGs comprised in the first TB;
a processor configured to adjust a contention window size (CWS) based on the first HARQ feedback corresponding to the plurality of CBGs, wherein the CWS is adjusted in accordance with a first rule based on the first received HARQ feedback corresponding to the CBG based HARQ feedback;
the transceiver further configured to receive a second HARQ feedback for a second TB of the plurality of TBs, wherein the second HARQ feedback corresponds to TB based HARQ feedback, and a single HARQ ACK/NACK is received for the second TB;
the processor further configured to adjust the CWS based on the second HARQ feedback corresponding to the second TB, wherein the CWS is adjusted in accordance with a second rule based on the second HARQ feedback corresponding to the TB based HARQ feedback, wherein the WTRU is configured to apply a greater weight to the single HARQ ACK/NACK received for the second TB when applying the second rule compared to a weight applied to each respective HARQ ACK/NACK for each of the plurality of CBGs when applying the first rule;
the processor further configured to determine, based on the adjusted CWS, that a channel used to transmit at least a second PUSCH transmission is clear; and
the transceiver further configured to transmit the second PUSCH transmission, based on the determination that the channel is clear.

7. The WTRU of claim 6, wherein at least one of the first or second received HARQ feedback is received within a time window.

8. The WTRU of claim 7, wherein the time window is defined by a set of slots.

9. The WTRU of claim 6, wherein the processor is further configured to: adjust the CWS in accordance with the first rule based on applying a first weighting coefficient to the first received HARQ feedback corresponding to the CBG based HARQ feedback and comparing the weighted first received HARQ feedback to a first threshold; and adjust the CWS in accordance with the second rule based on applying a second weighting coefficient to the second received HARQ feedback corresponding to the TB based HARQ feedback and comparing the weighted second received HARQ feedback to a second threshold.

10. A Wireless Transmit/Receive Unit (WTRU) comprising a processor and memory, the processor and memory configured to: transmit at least a first a Physical Uplink Shared Channel (PUSCH) transmission comprising a Transport Block (TB);receive Hybrid Automatic Repeat Request (HARQ) feedback for at least a portion of the TB, wherein the received HARQ feedback corresponds to one of Code Block Group (CBG) based HARQ feedback comprising a plurality of HARQ acknowledgements/negative acknowledgements (ACK/NACKs) for a plurality of CBGs comprised in the TB or to TB based HARQ feedback comprising a single HARQ ACK/NACK for the TB; reset a contention window size (CWS) based on the received HARQ feedback, wherein the WTRU is configured to reset the CWS in accordance with a first rule if the received HARQ feedback corresponds to the CBG based HARQ feedback and to reset the CWS in accordance with a second rule if the received HARQ feedback corresponds to the TB based HARQ feedback, wherein the WTRU is configured to apply a greater weight to the single HARQ ACK/NACK if the HARQ feedback corresponds to TB based HARQ feedback compared to a weight applied to at least one of the plurality of HARQ ACK/NACK corresponding to at least one of the plurality of CBGs if the HARQ feedback corresponds to CBG-based HARQ feedback when determining whether to reset the CWS; determine, based on the reset CWS, that a channel used to transmit at least a second PUSCH transmission is clear; and transmit the second PUSCH transmission, based on the determination that the channel is clear in accordance with the reset CWS.

11. The WTRU of claim 10, wherein the single HARQ ACK/NACK corresponds to an ACK of the TB.

12. The WTRU of claim 10, wherein each respective HARQ ACK/NACK for each of the plurality of CBGs corresponds to a respective ACK or respective NACK for each of the plurality of CBGs.

13. A Wireless Transmit/Receive Unit (WTRU) comprising a processor and memory, the processor and memory configured to:
transmit a first Physical Uplink Shared Channel (PUSCH) transmission comprising a first transport block (TB);
receive first Hybrid Automatic Repeat Request (HARQ) feedback for the first TB, the first HARQ feedback corresponding to TB based HARQ feedback;
determine to adjust or reset a contention window size (CWS) based on the first HARQ feedback using a first CWS adjustment rule, wherein the first CWS adjustment rule applies to TB based HARQ feedback;
transmit a plurality of second PUSCH transmissions during a reference time window, each of the second PUSCH transmissions comprising a respective second transport block, each respective second TB comprising a respective plurality of code block groups (CBGs);

receive second HARQ feedback associated with the plurality of second PUSCH transmissions that are transmitted during the reference time window, the second HARQ feedback corresponding to CBG based HARQ feedback for the plurality of second PUSCH transmissions that are transmitted during the reference time window;

determine to adjust or reset the CWS based on the second HARQ feedback using a second CWS adjustment rule, wherein the second CWS adjustment rule applies to a group of CBG based HARQ feedback for the plurality of second PUSCH transmissions that are transmitted during reference time window, wherein the first CWS adjustment rule applied to TB based HARQ feedback applies a different criteria for determining whether to adjust or reset the CWS in response to TB based HARQ feedback than criteria that is applied when using the second CWS adjustment rule for determining whether to adjust or reset the CWS in response to the group of CBG based HARQ feedback for the plurality of second PUSCH transmissions that are transmitted during the reference time window;

determine, based on the adjusted or reset CWS, that a channel used to transmit at least a third PUSCH transmission is clear; and transmit the third PUSCH transmission, based on the determination that the channel is clear in accordance with the adjusted or reset CWS.

14. The WTRU of claim 13, wherein the first HARQ ACK/NACK corresponds to an ACK of the first TB.

15. The WTRU of claim 14, wherein the second HARQ corresponds to a respective ACK or respective NACK for each of the plurality of CBGs.

16. The WTRU of claim 13, wherein the reference time window corresponds to a plurality of slots.

17. The WTRU of claim 13, wherein the reference time window corresponds to a channel occupancy time.

* * * * *